US009373174B2

(12) United States Patent
Blasch et al.

(10) Patent No.: US 9,373,174 B2
(45) Date of Patent: Jun. 21, 2016

(54) CLOUD BASED VIDEO DETECTION AND TRACKING SYSTEM

(71) Applicant: THE UNITED STATES OF AMERICA, AS REPRESENTED BY THE SECRETARY OF THE AIR FORCE, Washington, DC (US)

(72) Inventors: Erik P. Blasch, Rome, NY (US); Kui Liu, Germantown, MD (US); Bingwei Liu, Vestal, NY (US); Dan Shen, Germantown, MD (US); Genshe Chen, Germantown, MD (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 149 days.

(21) Appl. No.: 14/519,248

(22) Filed: Oct. 21, 2014

(65) Prior Publication Data

US 2016/0110885 A1     Apr. 21, 2016

(51) Int. Cl.
| | | |
|---|---|---|
| G06K 9/00 | (2006.01) | |
| G06T 7/20 | (2006.01) | |
| G06T 7/00 | (2006.01) | |
| G06T 7/40 | (2006.01) | |

(52) U.S. Cl.
CPC ............... *G06T 7/2066* (2013.01); *G06T 7/003* (2013.01); *G06T 7/204* (2013.01); *G06T 7/408* (2013.01); *G06T 2207/10016* (2013.01); *G06T 2207/10024* (2013.01); *G06T 2207/20036* (2013.01); *G06T 2207/20072* (2013.01)

(58) Field of Classification Search
None
See application file for complete search history.

(56) References Cited

U.S. PATENT DOCUMENTS

2010/0177194 A1* 7/2010 Huang .................... G06T 7/208
348/157

* cited by examiner

*Primary Examiner* — Stephen R Koziol
*Assistant Examiner* — Amandeep Saini
(74) *Attorney, Agent, or Firm* — Joseph A Mancini (57) ABSTRACT

A method for detecting and tracking multiple moving targets from airborne video within the framework of a cloud computing infrastructure. The invention simultaneously utilizes information from an optical flow generator and an active-learning histogram matcher in a complimentary manner so as to rule out erroneous data that may otherwise, separately, yield false target information. The invention utilizes user-based voice-to-text color feature description for track matching with hue features from image pixels.

17 Claims, 10 Drawing Sheets

CLOUD BASED VIDEO DETECTION AND TRACKING SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of cloud based video detection and tracking systems. More specifically, this disclosure presents the first attempt at detecting and tracking multiple moving targets from an airborne video within the framework of a cloud computing infrastructure for the application of suspicious behavior recognition.

The detection and tracking of moving objects is critical in many defense and security applications, where motion detection is usually performed in a preprocessing step, a key success in the following of a target tracking and automatic target recognition. Many videos used in defense and security applications are outdoor videos whose quality may be degraded by various noisy sources, such as atmospheric turbulence, sensor platform scintillation, etc. Meanwhile, moving objects may be very small occupying a few pixels only, which makes motion detection very challenging. Under this circumstance, existing approaches may generate significant amount of false alarms of detecting things that are not targets.

Motion detection has been extensively investigated. Many research works are conducted from indoor videos with large objects. As one of the major techniques, optical flow based approaches have been widely used for motion detection. There are two classic methods of optical flow computation in computer vision: Gunnar Farneback (GF) method and Lucas-Kanade (LK) method. Both of them are based on the two-frame differential algorithms. Since the LK method needs the construction of a pyramid model in sparse feature scale space and iterative computational updating at successively finer scales, a preferred approach would be to focus on the GF method for a dense optical flow computation.

BRIEF SUMMARY OF THE INVENTION

Experiments conducted for video detection and tracking applications appearing in the literature mostly involve stable lighting conditions and relatively stable image collections when using cameras. However, in practice, image information captured under realistic lighting conditions degrades considerably under moving background and unstable image collections. As a result, target detection and tracking becomes quite challenging and many false alarms get generated by existing approaches. In the present invention, a developed target detection and tracking system consists of cloud based image alignment, online target color calibration, optical flow detection and histogram matching.

OBJECTS AND SUMMARY OF THE INVENTION

It is therefore an object of the present invention to provide a method for the detection and tracking of moving objects.

It is a further object of the present invention to provide a method for the detection and tracking of moving objects that overcomes the prior art's limitations in generating false target alarms.

Briefly stated, the present invention achieves these and other methods through the detection and tracking of multiple moving targets from airborne video within the framework of a cloud computing infrastructure. The invention simultaneously utilizes information from an optical flow generator and an active-learning histogram matcher in a complimentary manner so as to rule out erroneous data that may otherwise, separately, yield false target information. The invention utilizes user-based voice-to-text color feature description for track matching with hue features from image pixels.

According to an embodiment of the present invention, a method for video detection and tracking of a target, comprising the steps of defining a target by selecting a dataset of target image frames from a database and selecting the desired color of the target; converting the color to a template hue histogram representation: initializing an image detector; performing target image frame alignment and registration in which homography matrices are generated; producing an optical flow field; executing morphology processing on the optical flow field so as to produce candidate target contours; matching the target contours to the template hue histogram representation; initializing tracking of the target and generating target tracks; aligning a current target image frame so as to form a sequential track of the target; and when the target is not located, redefining the target.

The above and other objects, features and advantages of the present invention will become apparent from the following description read in conjunction with the accompanying drawings, in which like reference numerals designate the same elements.

REFERENCES

Bao, C., et al., "Real-time robust L1 tracker using accelerated proximal gradient approach," IEEE Conference on Computer Vision and Pattern Recognition, Providence, R.I., 2012, pp. 1830-1837.

Bay, H., et al., "SURF: Speeded Up Robust Features," Computer Vision and Image Understanding, vol. 110, no. 3, June 2008, pp. 346-359.

Bruhn, A., et al., "Lucas/Kanade meets Horn/Schunck: combining local and global optic flow methods," International Journal of Computer Vision, vol. 61, no. 3, 2005, pp. 211-231.

Cloud optimized virtualization, "http://www.citrix.com/products/xenserver/overview.html"

Farneback, G., "Two-Frame motion estimation based on polynomial expansion," Image Analysis, vol. 2749, February 2003, pp. 363-370.

Harris, C., et al., "A combined corner and edge detector," Proceedings of the Alvey Vision Conference, 1988. pp. 147-151.

Horn, B., et al., "Determining optical flow", Artificial Intelligence, vol. 17, no. 1-3, 1981, pp. 185-203.

Horn, B., et al., "Determining optical flow: a retrospective", Artificial Intelligence, vol. 59, no. 1-2, 1993. pp. 81-87.

Hu, W., et al., "A survey on visual surveillance of object motion and behaviors," IEEE Transactions on Systems. Man, and Cybernetics—Part C: Applications and Reviews, vol. 34, no. 3, August 2004, pp. 334-352.

Liu, K., et al., "Real-time robust vision-based hand gesture recognition using stereo images." Journal of Real-Time Image Processing, February 2013, pp. 1-9.

Lowe, D., "Distinctive Image Features from Scale-Invariant Keypoints," International Journal of Computer Vision, Macau, vol. 60, no. 2, November 2004, pp. 91-110.

Lucas, B. et al., "An iterative image registration technique with an application to stereo vision," Proceedings of International Joint Conference on Artificial Intelligence, Vancouver, Canada, vol. 2, 1981, pp. 522.

Mei, X., et al, "Minimum Error Bounded Efficient L1 Tracker with Occlusion Detection," *IEEE Computer Vision and Pattern Recognition,* 2011.

Mitiche, A., et al., "Computation and analysis of image motion: a synopsis of current problems and methods," International Journal of Computer Vision, vol. 19, no. 1, 1996, pp. 29-55.

Senin, P., Dynamic Time Warping Algorithm Review, Technical Report, Information and Computer Science Department, University of Hawaii at Manoa, 2008.

Wang, L., et al., "High-quality real-time stereo using adaptive cost aggregation and dynamic programming," Proceedings of IEEE International Symposium on 3D Data Processing, Visualization, and Transmission, Chapel Hill. N.C., 2006, pp. 798-805.

Yilmaz, A., et al., "Object tracking: a survey," ACM Computing Surveys, vol. 38. no. 4, 2006, pp. 1-45.

Zhang, K., et al., "Real-time compressive tracking," European Conference on Computer Vision, Florence, Italy, 2012, vol. 7574, pp. 864-877.

DETAILED DESCRIPTION OF THE PREFERRED EMBODIMENT

The present invention utilizes a template hue histogram associated with specific color in a window as a matching feature to locate or redetect the target location estimate when its tracking is hampered by the environment. The candidate window with the histogram is generated from the optical flow field between two aligned consecutive frames. Any optical flow blob with a similar histogram will be considered as a strong potential candidate. The template hue histogram will be tuned according to the strong potential candidates. The goal of the online target color calibration is to adapt the present invention's subsequent color processing to the color characteristic of the light source under which images are captured. This technique has been previously used quite successfully for hand detection in order to cope with unknown color characteristics of various light sources encountered in practice. The calibration is performed from the beginning when the system is turned on or the tracked target is missing till the target is located or redetected. It involves updating the histogram in HSV color space to represent the color characteristics of the target being captured in an online or on-the-fly manner. The calibration is easily applied by a weighted linear addition between the template histogram and the strong candidate histogram. Representative color pixels of the target are collected within the window and the histogram is calibrated and used as a feature to perform target locating or redetection. Thus, the developed solution is designed to be robust to different background and lighting conditions.

The present invention also utilizes a cloud infrastructure to run image alignment or registration processes in parallel and thus a non-real-time algorithm can perform at a real-time frame rate. The well-known attractive features of cloud computing include on-demand scalability of highly available and reliable pooled computing resources, secure access to metered services from anywhere, and displacement of data and services from inside to outside the organization.

In the present invention, the target track generation based on the image alignment and registration enables further analysis and estimation to the target behavior. The image alignment is a process of transforming different sets of data into one coordinate system, since the homography matrix generated from the image alignment can further achieve the rotation and translation matrices. With the rotation and translation matrices, the coordinates in the previous frames are projected into the current frames and form a sequential track of the target. Since the image alignment consumes most of the computation in the framework, this step is adaptively allocated in a cloud infrastructure.

The goal of the present invention is the development of a general purpose detection framework to increase the robustness of detection by utilizing the information from the optical flow generator (OFG) and an active-learning histogram (AHM) matcher at the same time and in real-time. The OFG and AHM processes are deployed in such a way that they act in a complementary manner by an intersection of each other to rule out the erroneous data that may get detected by each process individually and thus capture the potential and valuable moving targets. Since the background in the airborne video is generally moving, a proper registration process is necessary to make the data integration of the whole image sequence possible.

As far as active-learning histogram matcher is concerned, the hue component of color in HSV (hue-saturation-value) space is used for tracking. A template hue histogram associated with a typical color is initialized at the start of the working flow. From the start of detection to the start of tracking, the template hue histograms keep actively calibrating according to the slight color changes of the targets. The histogram within a certain window is used as the target tracking feature in case the target was missing in the tracking and this feature makes detection and tracking robust. The active-learning histogram matcher is reported in the following section.

As far as cloud-based framework is concerned, a cloud computing system is built using Xenserver. A web portal in the cloud is provided for the user. From this web portal, the user chooses algorithms, datasets, and system parameters such as the desired processing frame rate, maximum frame duration, etc. A controller in the cloud will then decide the amount of computing resources to be allocated to the task in order to achieve the user's requirement of performance. Inside the cloud, there are several Virtual Machines (VMs) running on each physical machine. Each of these VMs is capable of running various detection, registration. and tracking algorithms. The computation consuming registration algorithm is usually run by several threads in one or more VMs. The other major contribution is that a non real-time algorithm achieves real-time performance based on the application of a cloud computing infrastructure. The processing speed is improved by parallel implementation and elastic resource usage of cloud computing.

Active-Learning Histogram Matcher

Figure 1:
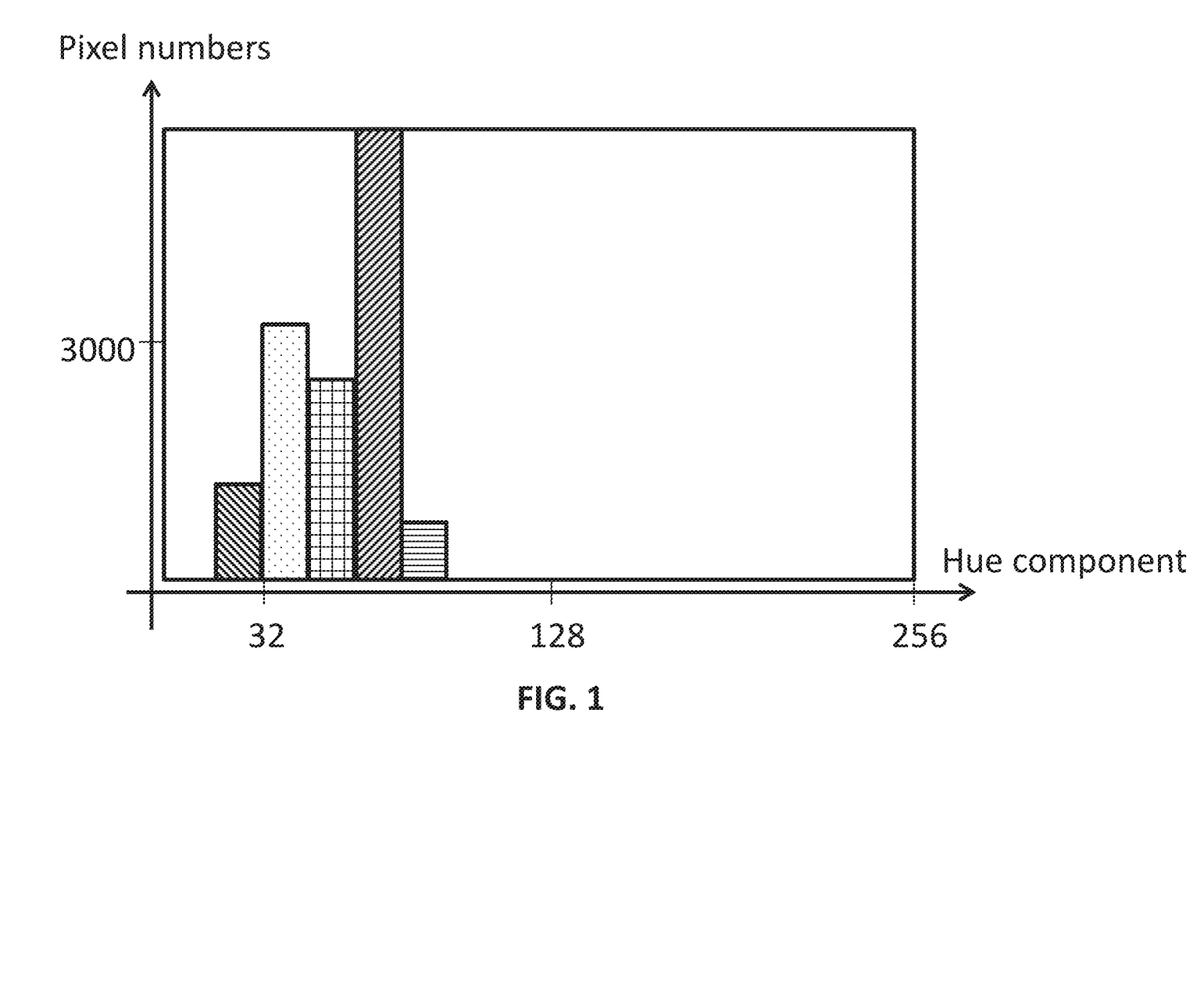
FIG. 1 depicts a typical template hue histogram in silver used for target matching. The color depth of hue component in HSV (hue-saturation-value) is set to 0 to 255 and they are divided into 16 bars with the same step width.
Figure 2:
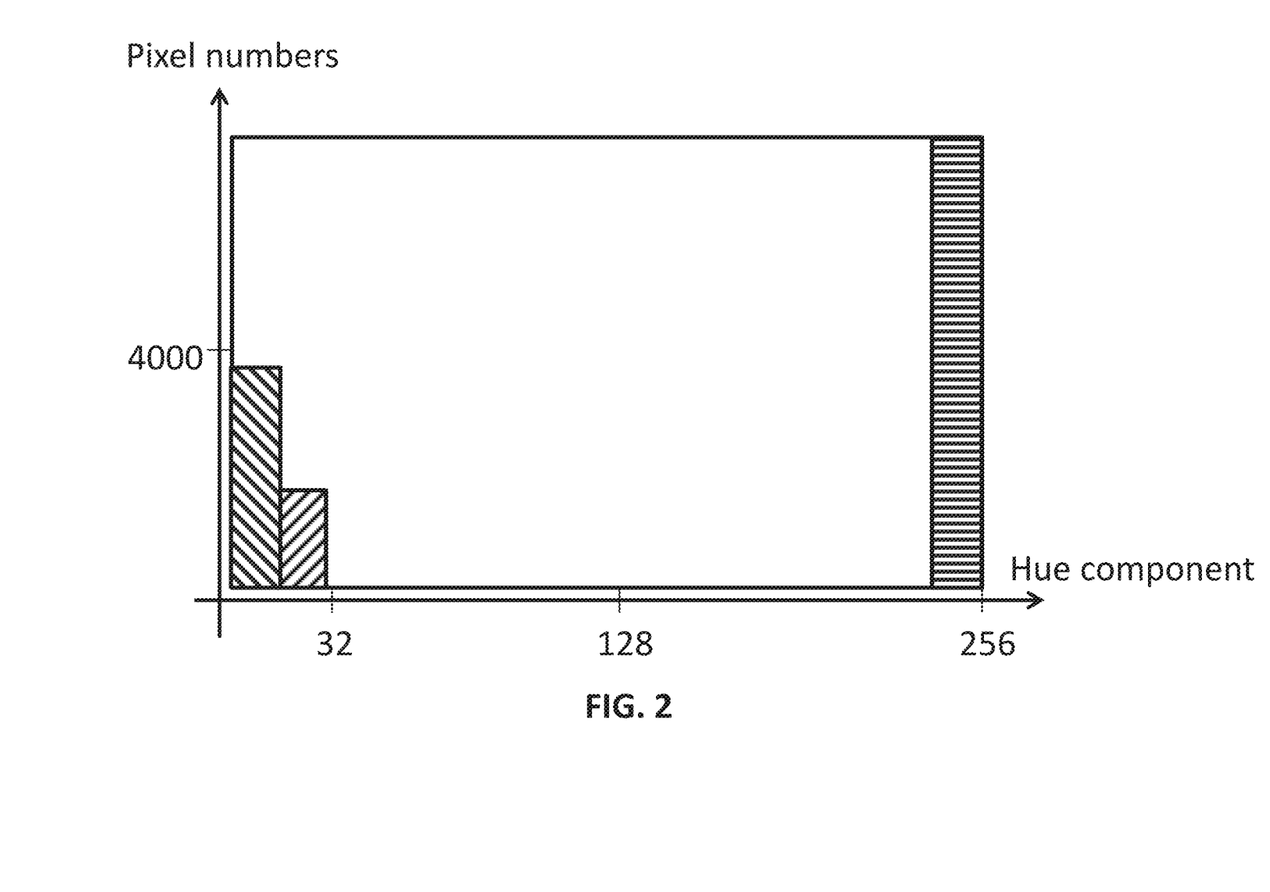
FIG. 2 depicts a typical template hue histogram in red used for target matching

Referring to FIG. 1 and FIG. 2, the existing feature descriptors including SIFT (Scale-Invariant Feature Transform), SURF (Speeded Up Robust Features) and Harris Corner pose feature challenges as far as the real-time aspect is concerned due to their computational complexity. To have a more computationally efficient matching, the active-learning histogram is adopted in the present invention. In the present invention, the color depth of hue component in HSV is set to 0 to 255 and they are divided into 16 bars with the same step width, which means each bar has 16 color bits. The two figures respectively represent two typically colored (e.g., Silver and Red) pixel distributions in Hue component space. The color distribution of the template histograms is considered as 16-component vectors: (e.g., Silver [0, 20, 45, 38, 75, 18, 0, 0, 0, 0, 0, 0, 0, 0, 0, 0] and Red [60, 28, 0, 0, 0, 0, 0, 0, 0, 0, 0, 0, 0, 0, 0, 110]). The active-learning of the histogram matcher is applied as:

$$C_{Template} = \alpha * C_{Template} + \beta * C_{Candidate} \quad (1)$$

As can be seen in equation (1), the calibration to the template component histogram is performed in each frame by the weighted linear addition. The given $C_{Template}$ is used to represent the current template histogram, $C_{Candidate}$ can be considered for the strong candidate histogram. $\alpha$ and $\beta$ are two weighting factors of the linear additive calibration. In the present invention $\alpha$ is chosen as 0.9 and $\beta$ as 0.1 to update the current template Hue component histogram. The candidate histogram windows with the histogram are generated from the optical flow field between two aligned consecutive frames.

Figure 3:
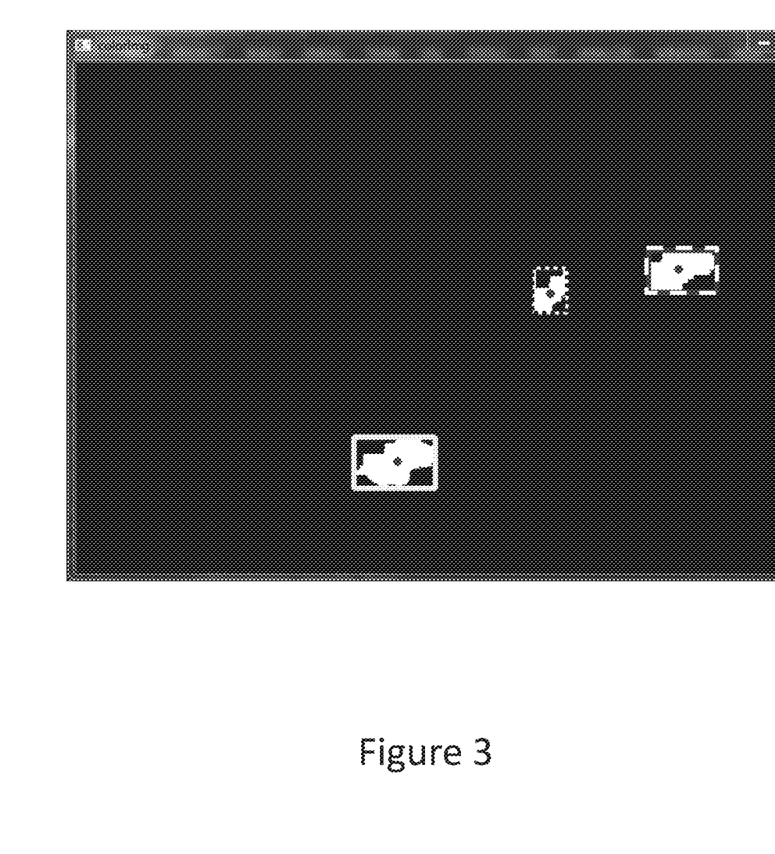
FIG. 3 shows a binary image including the strong candidate windows based on the optical flow field in the frame. The window with the solid white boundary represents that it is a good match of the target in silver, while the one with the dashed white boundary represents that it is a good match of the target in red, and the one with the default dotted white boundary represents that it is not a good match with any of the templates.

Referring to FIG. 3, the three white blobs are generated from the optical flow field after image alignment and the bounding rectangles are considered as candidate windows. The candidate windows with the most similar Hue histogram are selected as the true target and these candidate Hue histograms are used to calibrate the current template histogram. As can be seen in the Figure, there are three strong candidate windows in this frame. As expected, the candidate on the right hand side matched with the red template and the one on the left hand side matched with the silver template, while the one in the middle is ruled out because of the low similarity of the histogram with the template histograms. In the present invention, the vectors consist of 16 consecutive numbers of the bars in the histogram are considered the color feature distribution of the windows. The Dynamic Time Warping (DTW) algorithm is used as the histogram matcher as this algorithm is capable of generating the dynamic distance between an unknown signal and a set of reference signals in a computational efficient manner. The sample signal comes from the vector of the current template histogram. Note that the introduced silver and red template hue histograms in the present invention is for general purpose matching in the sense that it is applicable to other color histogram matching.

Figure 4:
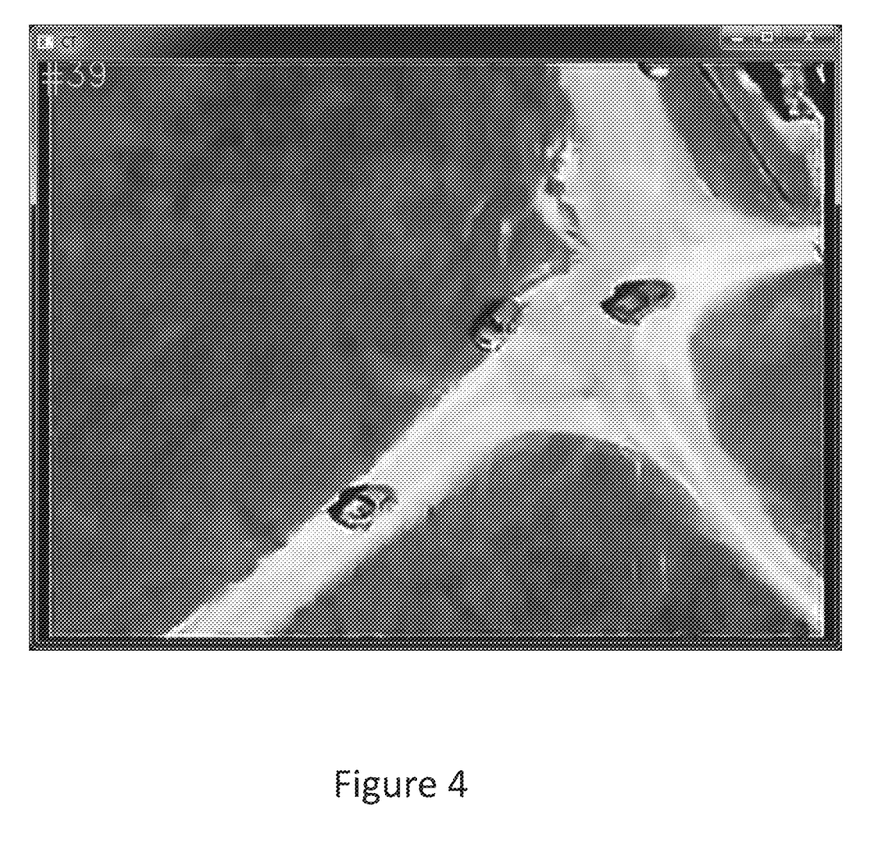
FIG. 4 shows an original RGB (red-green-blue) image for the visible reference to the system operator.

Referring to FIG. 4, an original RGB (red-green-blue) image for the visible reference is presented to the system operator. Note that the grayscale depiction of FIG. 4 is presented for the purposes of the invention application.

Figure 5:
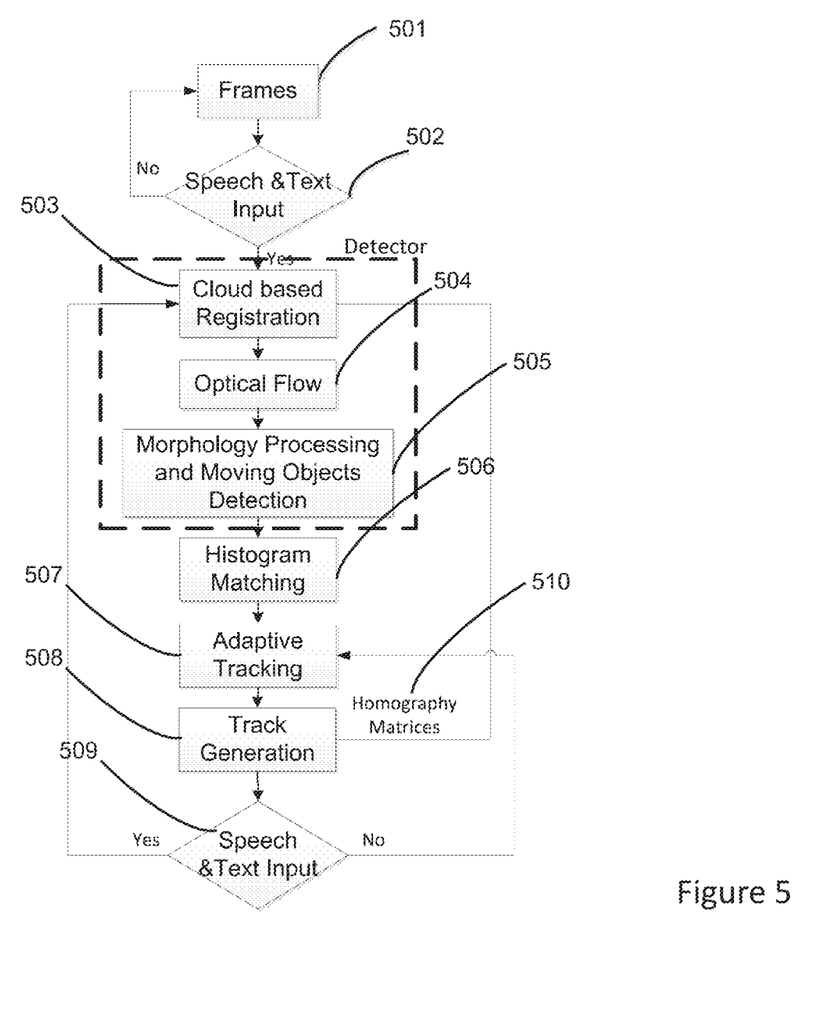
FIG. 5 depicts a flowchart that describes the main components and the process of the cloud based video detection and tracking system.

Referring to FIG. 5 depicts an exemplary flowchart which describes how the present invention works. In Step 501 the dataset of images in frame available in the cloud was selected at the beginning of the flow. In Step 502 a speech or voice command calls out the color desired of the target and was converted into a text input which is used to describe the feature of the targets. The text designation of the target is converted into a Hue representation using the gamut colorspace naming convention. In the present invention, color distribution of the histogram is used to recognize and locate the targets of interest. In Step 503 once the command has been given, the detector as shown in the red box is initialized. The first step in the detector is image alignment (Homography Matrices generation) and registration. This step is the most computation-consuming step thus it is applied in cloud and performed in a computational efficient manner. In Step 504 based on the homography matrices and then the registered frames, the optical flow field is generated. In Step 505, morphology processing which includes a Closing and an Opening operation using a 3×3 square structuring element is applied on the optical flow field. The leftover blobs of the morphology processing are considered as strong candidate contours of the target. In Step 506, the histogram templates of colors which are described in Step 502 are used to match and recognize the valuable targets. In Step 507, the tracker is initialized. In the present invention, either a L1-tracker or a Compressive tracker are two options which are used to track the targets of interest. In Step 508, based on the homography matrices generated from the cloud infrastructure in Step 503, the prior tracks of the objects are projected in current frame 510. In Step 509, in the event that the present invention cannot correctly locate the target, the speech command or text input is fed into the system to redefine or relocate the targets of interest.

Cloud Infrastructure Based Image Alignment

Figure 7:
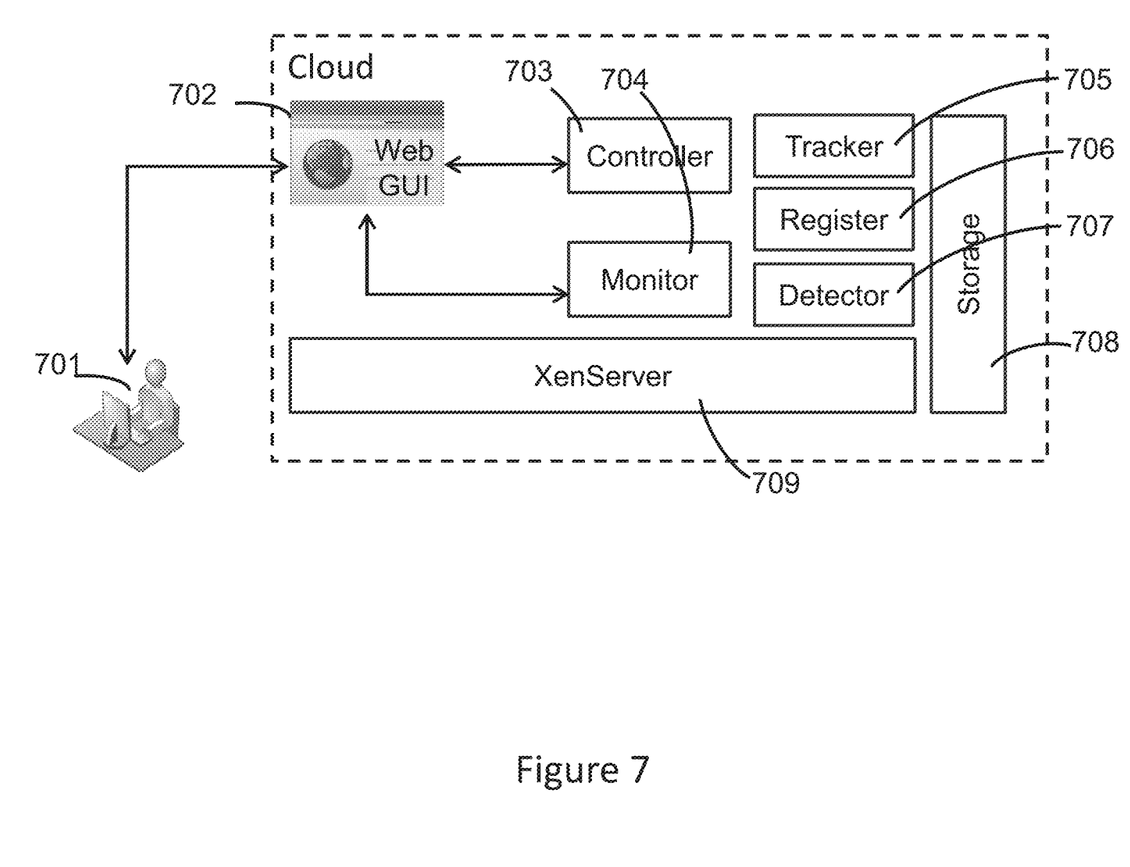
FIG. 7 depicts a high level view of a host computer in the cloud system.

Referring to FIG. 7 depicts a high level view of a host in the cloud system. XenServer 709 serves as the Virtual Machine (VM) Manager, or hypervisor, of each physical server in the cloud. All components of the same task have access to a shared storage 708 in the cloud. The user 701 only interacts with the system through the Web GUI 702. The user's computing requests are delivered to controller 703 for further processing. The controller assigns an appropriate number of jobs to VM Workers for each request. Each VM Worker runs one or more of the assigned tasks (detector 707. tracker 705 and register 706) and sends the results to the controller. The web GUI 702 will then display the processing result in real-time once the backend processing starts. The Monitor 704 uses a database to store real-time performance of all tasks in the system. It also monitors the cloud's performance such as average CPU (central processing unit) load and memory usage. The user chooses what metrics to display on the web GUI 702 and can call other visual analytic tools such as a rendering on a ground plane, road network, or 3-dimensional trajectory.

Interactive Tracking Module

The interactive tracking module provides the options to choose various detectors. registers, tracker algorithms and desired processing frame rates as parameters before the system initializes. Each combination of detector, register, tracker and frame rate consists of a configuration of the system. Once a configuration is chosen by the user, the system will start to process the video sequence once the processing command is received from the web GUI. A target in the initial frame can also be manually or audibly identified by the user as an alternative to a detector that selects the pixel boundary representing the target.

In the target detection and tracking scenario, the key components of the present invention perform the following tasks:

User. The user chooses configuration of the system, can verbally designate a color of the object, and sends commands to the system to initiate a task.

Web GUI. The web GUI communicates with the user by receiving input commands, displays processing results, and presents analytical system performance.

Controller. The Controller receives commands from the web GUI, makes decisions on how many resources are needed to satisfy the required performance, assigns jobs and tasks to virtual machines in the cloud, combines processing results of different components into resultant frames, calculates processing speed in real-time and informs the web GUI processing results.

Monitor. The Monitor collects performance metrics such as processing speed and system load, and provides a query service for the web GUI when there is a need to display these metrics.

Virtual Machines (VMs). Each VM can act as a detector, register or tracker in the system. The actual roles a VM will perform are decided by the Controller.

Voice Command Tracking

Figure 8:
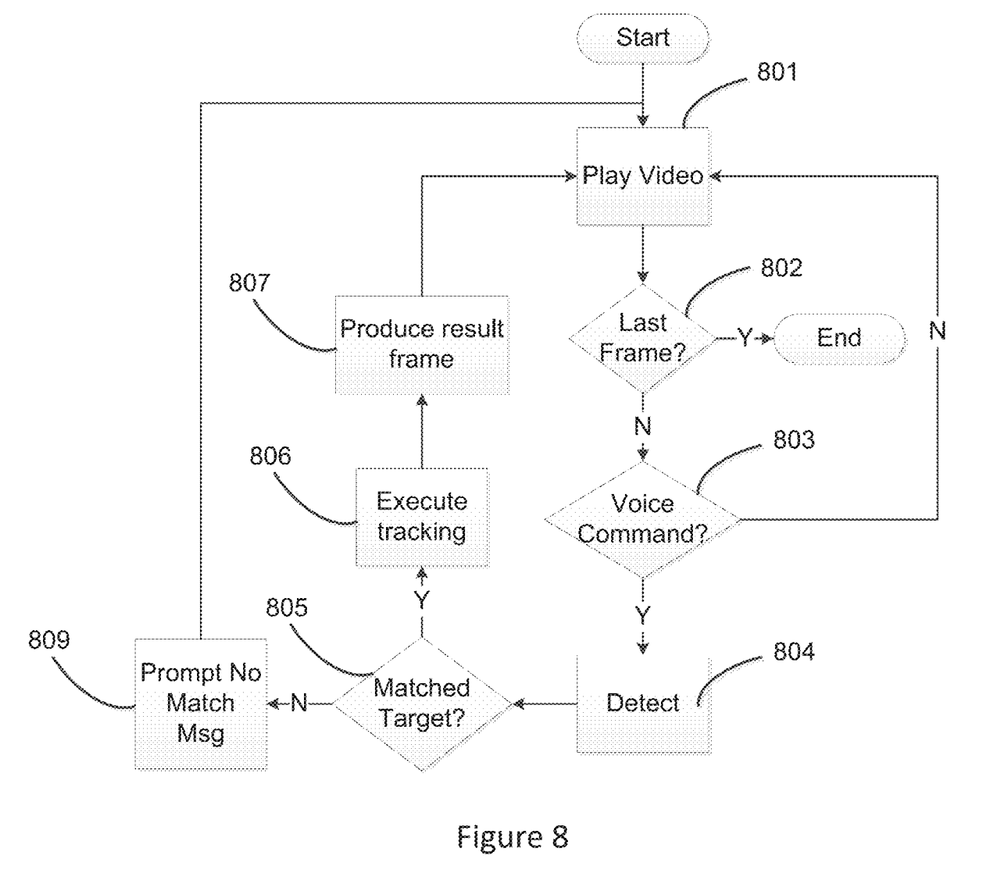
FIG. 8 shows the overall data flow of the tracking module.

Referring to FIG. 8. the voice command tracking module is able to receive commands from the user's speech in real-time. FIG. 8 shows the overall data flow of this module. The system starts and enters "Play Video" 801, displaying the video sequence on the web GUI. At 802, the web GUI keeps checking if the current frame is the last frame. If it is, the web GUI stops at the last frame, otherwise it listens to any voice signal from the user at 803. The user triggers a voice command at any time before the last frame is displayed. When speech signals are received from the user's microphone, the system first runs speech recognition to identify the command. If a command is recognized, the command is sent to a detector running in the cloud, entering detect 804. The matcher 805 utilizes the speech command converted to text from which the text color designation is transformed into Hue space for matching with the detector processing the Hue of the pixels in the image. When there is a matched target, a tracker will take over the execution at 806, in coordinating with multiple registers determined by the Controller. The Controller will then combine processing results from trackers and registers and produce the resultant annotated video sequence 807. The web GUI will switch to display processed frames once the first processed frame is available. If there is no matched target in the current frame, the web GUI will prompt a message to the user at 809 and continue to display the next frame.

Figure 9:
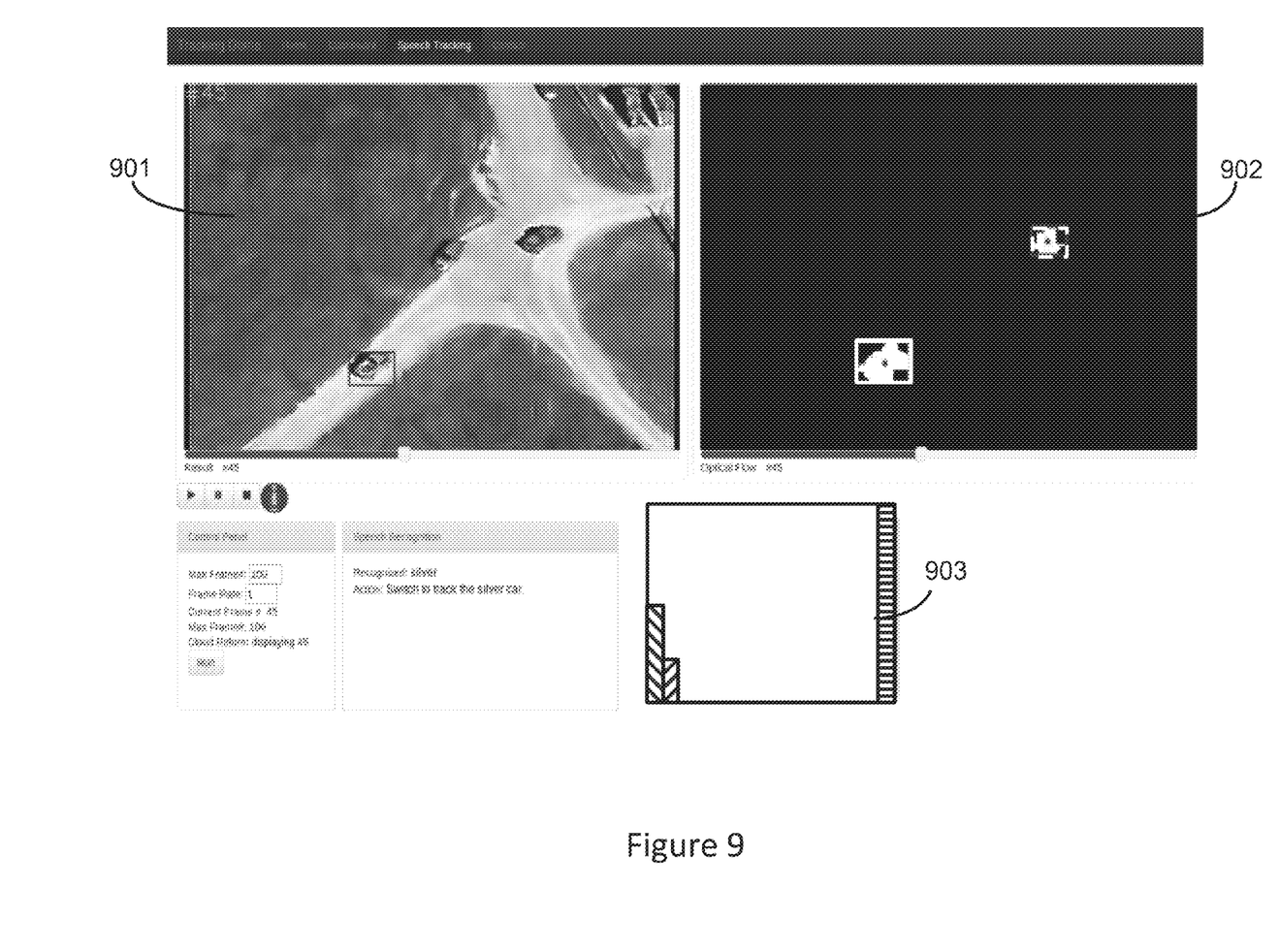
FIG. 9 shows the web GUI (graphical user interface) when the user triggers a voice command to track the silver car in the video sequence.

Referring to FIG. 9, the web GUI displays the system output when the user triggers a voice command to track the silver car in the video sequence. There are three windows 901, 902 and 903 in FIG. 9. Window 901 displays the original frames when no voice command is received. Once a voice command is triggered, the frames in this window will be replaced by processed frames with rectangle box on the target. On the right side of the video frame is the optical flow window 902, synchronized with the current video frame. Window 903 is the histogram of current frame used by the detector to detect the target. The web GUI also supports a User Defined Operating Picture (UDOP) reconfigurable display.

System Monitoring Module

Figure 10:
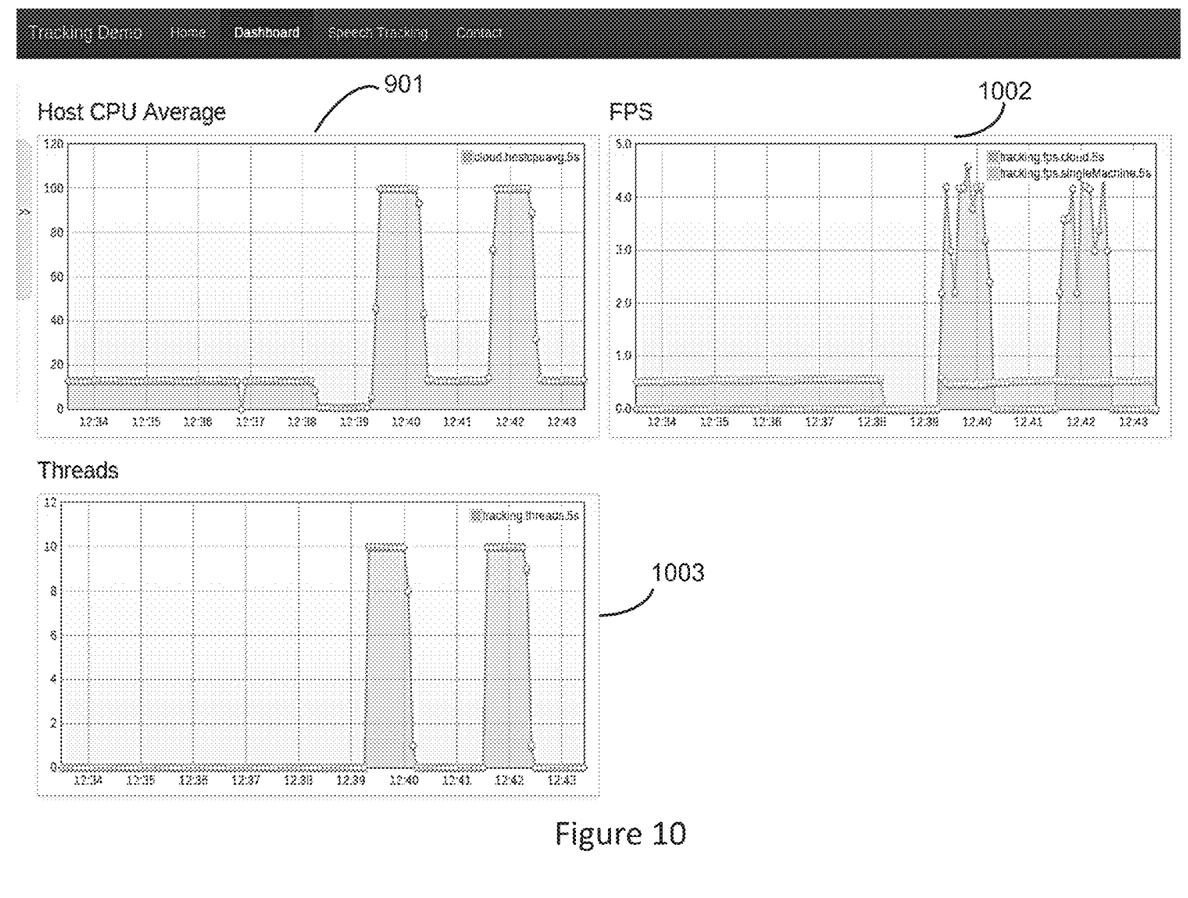
FIG. 10 shows an instance of the system monitoring module or the dashboard on the web GUI.

Referring to FIG. 10, an instance of the System Monitoring Module or the dashboard on the web GUI is shown. Upon entering the dashboard page, the user can choose one or more metrics, provided by the monitor, to be displayed. The selected charts are then created on the fly by the web GUI. Once all charts are created, the web GUI starts to query with the monitor and retrieve all data for each chart. In FIG. 10 the charts 1001, 1002, and 1003 provide real-time monitoring metrics the user chose, updated every five seconds. Chart 1001 depicts the Cloud host average CPU utilization, which is an indication of the fulfillment of service level agreement (SLA). Chart 1002 illustrates the real-time processing performance, the frame per second (fps) processing rate. As a baseline, the fps of all algorithms running on a single machine are provided. Chart 1003 shows the number of register threads/processes running when executing the task.

Target Track Generation

As the homography matrices of the frames are generated from the cloud infrastructure based image alignment, the rotation and translation matrices derived from homography matrices makes the integration of the whole image sequence possible. Thus prior tracks of the objects are projected into current frame. The homography matrix H, generated from image alignment, consists of 9 components.

$$H = \begin{bmatrix} h_1 & h_2 & h_3 \\ h_4 & h_5 & h_6 \\ h_7 & h_8 & h_9 \end{bmatrix} \quad (2)$$

Since the airborne transformation between frames are not only affine but also projective, the geometric transformation can be represented by a matrix from $$H = \begin{bmatrix} a & b & c \\ d & e & f \\ g & h & 1 \end{bmatrix} \quad (3)$$

Thus we have $$\begin{bmatrix} x_{new} \\ y_{new} \\ 1 \end{bmatrix} = \frac{\begin{bmatrix} a & b & c \\ d & e & f \\ g & h & 1 \end{bmatrix} \begin{bmatrix} x \\ y \\ 1 \end{bmatrix}}{\begin{bmatrix} g & h & 1 \end{bmatrix} \begin{bmatrix} x \\ y \\ 1 \end{bmatrix}} \quad (4)$$

Equation (4) is an iterative process where $$x_{new} = \frac{ax + by + c}{gx + hy + 1} \text{ and } y_{new} = \frac{dx + sy + f}{gx + hy + 1}, x_{new} \text{ and } y_{new}$$

represent the coordinates of the track generated in the current frame which consist of the registered previous track x and y. In the Homography matrix $$H, \begin{bmatrix} a & b \\ d & e \end{bmatrix}$$

represents the rotation matrix R, while $$\begin{bmatrix} c \\ f \end{bmatrix}$$

represents the translation matrix t. Rotation and translation matrices are called the matrix of extrinsic parameters. They are used to describe the camera motion around a static scene. [g h] gives the projective parameters, which describe the radial distortion and slight tangential distortion.

Figure 6:
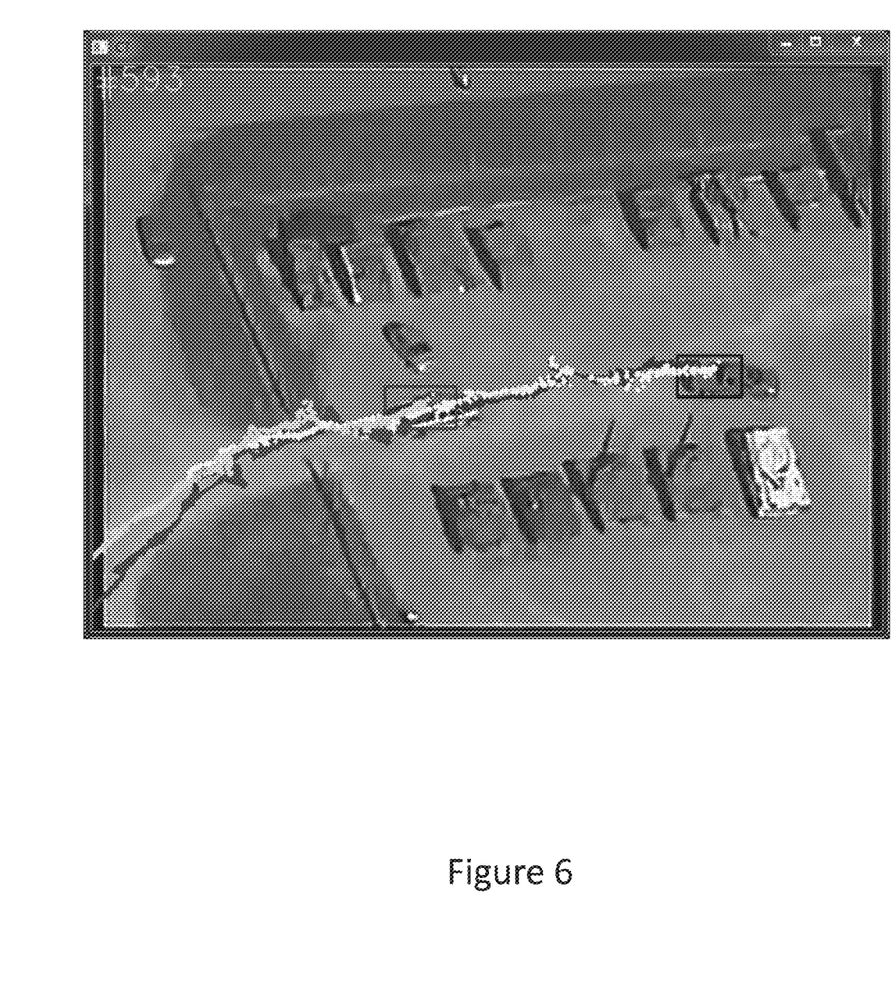
FIG. 6 shows an image with the detected targets and the registered tracks.

Referring to FIG. 6. the registered tracks are displayed in the current frame, which record the motion curves of the objects of interest. In the present invention, two registration algorithms are applied: RANSAC (RANdom SAmple Consensus) and LMEDS (Least MEDian of Squares). The tracks of RANSAC are shown as light dots, while the ones using LMEDS are shown in darker lines (one track for each target). At the beginning of the work flow, one of these algorithms is selected to align the image sequences.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for video detection and tracking of a target, comprising the steps of:
   defining said target, wherein in said step of defining further comprises the steps of:
      selecting a dataset of target image frames from a database; and
      selecting the desired color of said target;
   converting said color to a template hue histogram representation;
   initializing an image detector;
   performing target image frame alignment and registration in which homography matrices are generated;
   generating an optical flow field;
   performing morphology processing on said optical flow field so as to produce candidate target contours;
   matching said target contours to said template hue histogram representation;
   initializing tracking of said target and generating target tracks;
   aligning current said target image frame so as to form a sequential track of said target; and
   when said target is not located, redefining said target.

2. The method of claim 1, wherein said step of generating an optical flow field further comprises generating an optical flow field between two aligned consecutive target image frames.

3. The method of claim 2, further comprising the step of identifying strong target candidates from the occurrence of optical flow blobs in said optical flow field.

4. The method of claim 3, further comprising the step of tuning said template hue histogram according to said strong target candidates.

5. The method of claim 4, wherein said step of tuning said template hue histogram further comprises the steps of:
   adapting color processing to the color characteristic of the light sourced under which said target image frames are captured; and
   updating said template hue histogram in HSV color space to represent the color characteristics of said target image frame being captured.

6. The method of claim 5, wherein said step of updating further comprises the steps of:
   performing a weighted linear addition between said template hue histogram and a hue histogram corresponding to said strong target candidate; and
   collecting color pixels of said strong target candidate.

7. The method of claim 1, wherein said step of performing current target image frame alignment further comprises the steps of:
   generating rotation and translation matrixes from said homography matrices; and
   projecting, using said rotation and translation matrices, prior target frames of said target into a current target image frame.

8. The method of claim 6, wherein the color depth of said hue histogram is divided into 16 segments over the value range of 0 to 255.

9. The method of claim 8, wherein said step of weighted linear addition further comprises the steps of:
   computing a current template histogram according to the expression:

$$C_{Template} = \alpha * C_{Template} + \beta * C_{Candidate}$$

wherein
   $C_{Template}$ is the current template histogram;
   $\alpha$ is a first weighting factor;
   $\beta$ is a second weighting factor; and
   $C_{Candidate}$ is a strong candidate for a histogram window.

10. The method of claim 9, wherein
   $\alpha$ is selected as 0.9; and
   $\beta$ is selected as 0.1.

11. The method of claim 10, further comprising the step of selecting candidate histogram windows with the most similar hue histogram as a true target.

12. The method of claim 7, wherein said step of performing target image frame alignment and registration is performed in a cloud computing environment.

13. The method of claim 12, and wherein said cloud computing environment is accessed through a Graphical User Interface (GUI).

14. The method of claim 13, wherein said cloud computing environment is further accessed through voice command.

15. The method of claim 7, wherein said homography matrix is a 3 by 3 matrix represented by $$H = \begin{bmatrix} a & b & c \\ d & e & f \\ g & h & 1 \end{bmatrix}.$$

16. The method of claim 7, wherein said rotation matrix R is represented by $$\begin{bmatrix} a & b \\ d & e \end{bmatrix}$$

said transformation matrix t is represented by $$\begin{bmatrix} c \\ f \end{bmatrix}$$

and projective parameters are represented by
[g h].

17. The method of claim 7, further comprising the step of computing the coordinates of a track generated in a current frame, $X_{new}$ and $y_{new}$, according to $$x_{new} = \frac{ax + by + c}{gx + hy + 1}$$

and $$y_{new} = \frac{dx + ey + f}{gx + hy + 1}.$$

* * * * *